United States Patent [19]
Smedberg et al.

[11] Patent Number: 4,930,336
[45] Date of Patent: Jun. 5, 1990

[54] SINGLE ACTION CYLINDER

[75] Inventors: Kenneth L. Smedberg, 5 Oak Hill Drive, Crete, Ill. 60417; George J. Bozich, Chicago; Robert J. Kotynski, South Holland, all of Ill.

[73] Assignee: Kenneth L. Smedberg, Crete, Ill.

[21] Appl. No.: 304,186

[22] Filed: Jan. 30, 1989

Related U.S. Application Data

[63] Continuation-in-part of Ser. No. 6,732, Jan. 22, 1987, Pat. No. 4,825,681.

[51] Int. Cl.⁵ ............................................. B21D 24/02
[52] U.S. Cl. ................................. 72/453.13; 72/344; 267/119; 267/122; 267/130; 267/259
[58] Field of Search ..................... 72/453.13, 347, 348, 72/349, 344, 456, 455, 453, 350, 465; 267/118, 119, 35, 122, 130, 64.19, 64.25, 64.24, 64.27; 100/214, 259, 267

[56] References Cited

U.S. PATENT DOCUMENTS

| | | |
|---|---|---|
| 2,773,686 | 12/1956 | Nash . |
| 2,827,283 | 3/1958 | Browne et al. . |
| 2,887,069 | 5/1959 | Lich . |
| 2,902,291 | 9/1959 | Walker . |
| 2,999,682 | 9/1961 | Stump ................................... 267/65 |
| 3,664,653 | 3/1972 | Walker ................................ 267/122 |
| 4,674,911 | 6/1987 | Gertz ................................... 267/122 |
| 4,732,033 | 3/1988 | Smedberg et al. ............... 72/453.13 |
| 4,736,615 | 4/1988 | Smedberg et al. ............... 72/453.13 |
| 4,796,460 | 1/1989 | Smedberg et al. ............... 72/453.13 |
| 4,825,681 | 5/1989 | Smedberg et al. ..................... 72/344 |
| 4,860,571 | 8/1989 | Smedberg et al. ............... 72/453.13 |

FOREIGN PATENT DOCUMENTS

| | | | |
|---|---|---|---|
| 0131850 | 10/1981 | Japan ................................... 267/122 |
| 0137636 | 8/1984 | Japan ................................... 267/122 |

Primary Examiner—David Jones
Attorney, Agent, or Firm—Anthony S. Zummer

[57] ABSTRACT

A single action cylinder is used with a machine. The machine has a first part and a second part having reciprocating motion relative to each other. The single action cylinder affects the reciprocation between the first and second parts. The cylinder includes a base adapted for attachment to one of said parts. The cylinder includes a plurality of open ended longitudinally extendable resilient actuators stacked one above the other. A first actuator of said actuators has one end connected to the base. Each of the actuators is interconnected to an adjacent actuator to allow a fluid to flow between the actuators. A second actuator of the actuators has one end connected to an apparatus for attaching the second actuator to the other of the parts. An elongated guide is connected to one of the actuators to limit movement of that actuator in a direction transverse to the length of the guide. One actuator has one end not connected to the guide but rather that end is free to move in all directions relative to the guide to allow the cylinder to affect reciprocation between the parts without creating extraneous loading on the first and second parts because of improper alignment between the first and second parts and the single action cylinder.

21 Claims, 8 Drawing Sheets

FIG_6_

FIG_7_

FIG_8_

FIG_9

FIG-10

SINGLE ACTION CYLINDER

CROSS-REFERENCE TO RELATED APPLICATION

The instant application is a continuation-in-part of applicants' copending patent application entitled, "Pneumatic Press Counterbalance And Cushion Construction", Ser. No. 07/006,732, having a filing date of Jan. 22, 1987 now U.S. Pat. Ser. No. 4,825,681, issued May 2, 1989.

BACKGROUND OF THE INVENTION

The present invention relates to a single action cylinder for use with a machine which machine has a first part and a second part having reciprocating motion relative to each other for affecting the reciprocation between said first and second parts.

It is well known to use pneumatic cushions and counterbalances having stacked resilient actuators with a wide variety of machines, such as, power presses, welders, and the like. The benefits which are derived from the utilization of stacked actuators in a cushion or counterbalance are appreciated, however, there is a problem in the utilization of stacked actuators. It may be appreciated that the cushion or counterbalance typically contains some sort of guide for the stacked actuators which requires that the direction of movement of the cushion or counterbalance must be parallel to the direction of movement of a movable portion of a machine such as a press or a welder. Furthermore, it may be appreciated that the guides or ways for a machine may not be perfectly straight and the guide of the cushion or counterbalance may not be perfectly straight either. If the divergence from the required norm of both the guide or way of the machine and the guide of the counterbalance or cushion are too great or in opposite directions, there may be a binding of the reciprocating parts of the machine or of the cushion or counterbalance. The binding typically results from extraneous loadings on the relatively reciprocating parts of the machine as well as the relatively reciprocating parts of the cushion or counterbalance. The extraneous loading not only causes a loss of power, but also abnormal wear on the parts of the machine and the cushions or counterbalance which reduces the life expectancy of all of the parts.

The utilization of cushions having guide rods in a power press is disclosed in detail in U.S. Letters Patent No. 4,732,033, issued Mar. 22, 1988, to Smedberg et al, and entitled, "Pneumatic Die Cushion". A specific disclosure of a counterbalance used in conjunction with a press is disclosed in U.S. Letters Patent No. 4,736,615, issued April 12, 1988, to Smedberg et al, and entitled, "Pneumatic Press Counterbalance". Another cushion construction for use with a press is taught in U.S. Letters Patent No. 4,796,460, issued Jan. 10, 1989, to Smedberg et al, and entitled, "Cushion Construction Including Snubber". It may be seen from all of the disclosures how the guides for the counterbalance or die cushions are substantially rigid in relation to the movement of reciprocating parts of a press so that non-alignment of the die cushion or the counterbalance results in extraneous loadings on the reciprocating parts.

Stacking of the resilient actuators is well known and accepted in the transportation industry. U.S. Pat. Ser. No. 2,773,686, issued Dec. 11, 1956, to C.B. Nash, entitled "Air Spring" discloses a construction wherein two bellows are interconnected. The Nash connector utilizes a conventional construction. The conventional construction for bellows of this type is also shown in the following patents: U.S. Pat. Ser. No. 2,827,283, issued Mar. 18, 1958, to K.A. Browne et al., entitled, "Air Spring With Damping Valve"; U.S. Pat. Ser. No 2,887,069, issued May 19, 1959, to R.L. Rich, entitled, "Air Spring Railway Truck"; U.S. Pat. Ser. No. 2,902,291, issued Sept. 1, 1959, to L.B. Walker, entitled, "Vehicle Pneumatic Suspension System"; and U.S. Pat. Ser. No. 2,999,682, issued Sept. 12, 1961, to E. Stump, entitled, "Pneumatic Spring System For Motor Vehicles".

It is an object of the present invention to provide an improved single action cylinder having stacked actuators which cylinder substantially eliminates binding of parts having reciprocating motion relative to each other when the single action cylinder is used in conjunction with the parts even though there is imperfect alignment between the cylinder and the parts.

SUMMARY OF THE INVENTION

The herein disclosed invention relates to an improved construction for a single action cylinder having stacked resilient actuators. The instant single action cylinder is particularly adapted for use in a machine, which machine has parts having reciprocating motion relative to each other. The single action cylinder affects the reciprocation of the parts. The cylinder includes a base adapted for attachment to one of the parts of the machine. The single action cylinder includes a plurality of open ended longitudinally extendable resilient actuators. One of the actuators has one end connected to the base. The actuators are interconnected to adjacent actuators to allow fluid to flow from one actuator to an adjacent actuator Another of the actuators has one end connected to means for attaching said actuator to the other of said parts of the machine. An elongated guide is connected to an actuator to limit movement of that actuator in a direction transverse to the length of the guide. One actuator has one end not connected to the guide which allows that end to be free to move in all directions relative to the guide. Freedom of movement of said one end of the actuator not connected to the guide allows the cylinder to affect reciprocation between the first and second parts without creating extraneous loadings on the first and second parts.

DESCRIPTION OF THE PREFERRED EMBODIMENT

Figure 1:
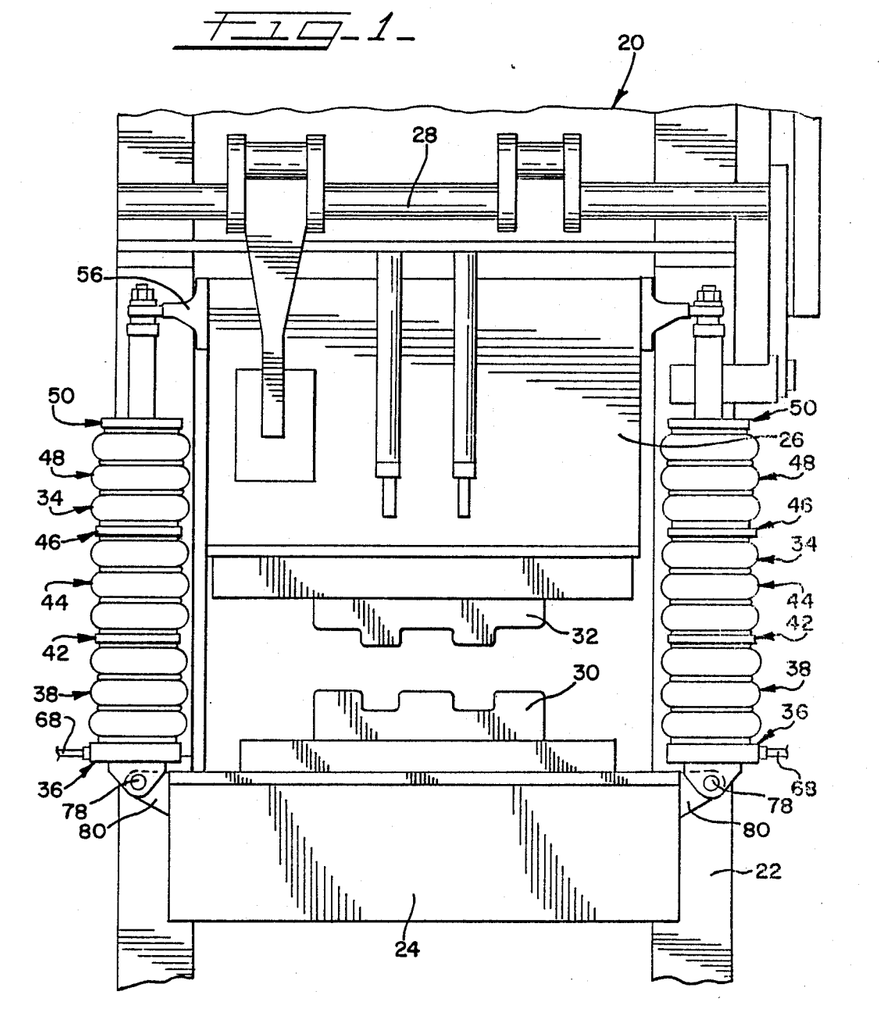
FIG. 1 is a front elevational view showing a conventional press having a pair of single action cylinders mounted on the press, each of the cylinders embodying the herein disclosed invention.

Referring now to the drawings and especially to FIG. 1, a conventional power press 20 is shown therein. The power press includes a conventional frame 22 with a conventional bed 24 mounted on the frame. A conventional ram 26 is reciprocally mounted in the frame. Ram 26 is moved up and down within the frame by a conventional crank shaft 28 which is driven by a conventional motor which is not shown herein. A die has a fixed portion 30 mounted on the bed and a movable portion 32 secured to a ram 26 as is conventional. A pair of identical single action cylinders 34 is connected to a first part or a movable part of the press, that is, ram 26, and to a second part or a fixed part of the press, that is, frame 22, for affecting reciprocation of the ram relative to the frame both when the ram is moving down as well as when it is moving up as is well known in the art. FIGS. 2-8 show the specific construction of single action cylinders 34 which are identical to each other.

Figures 2, 3:
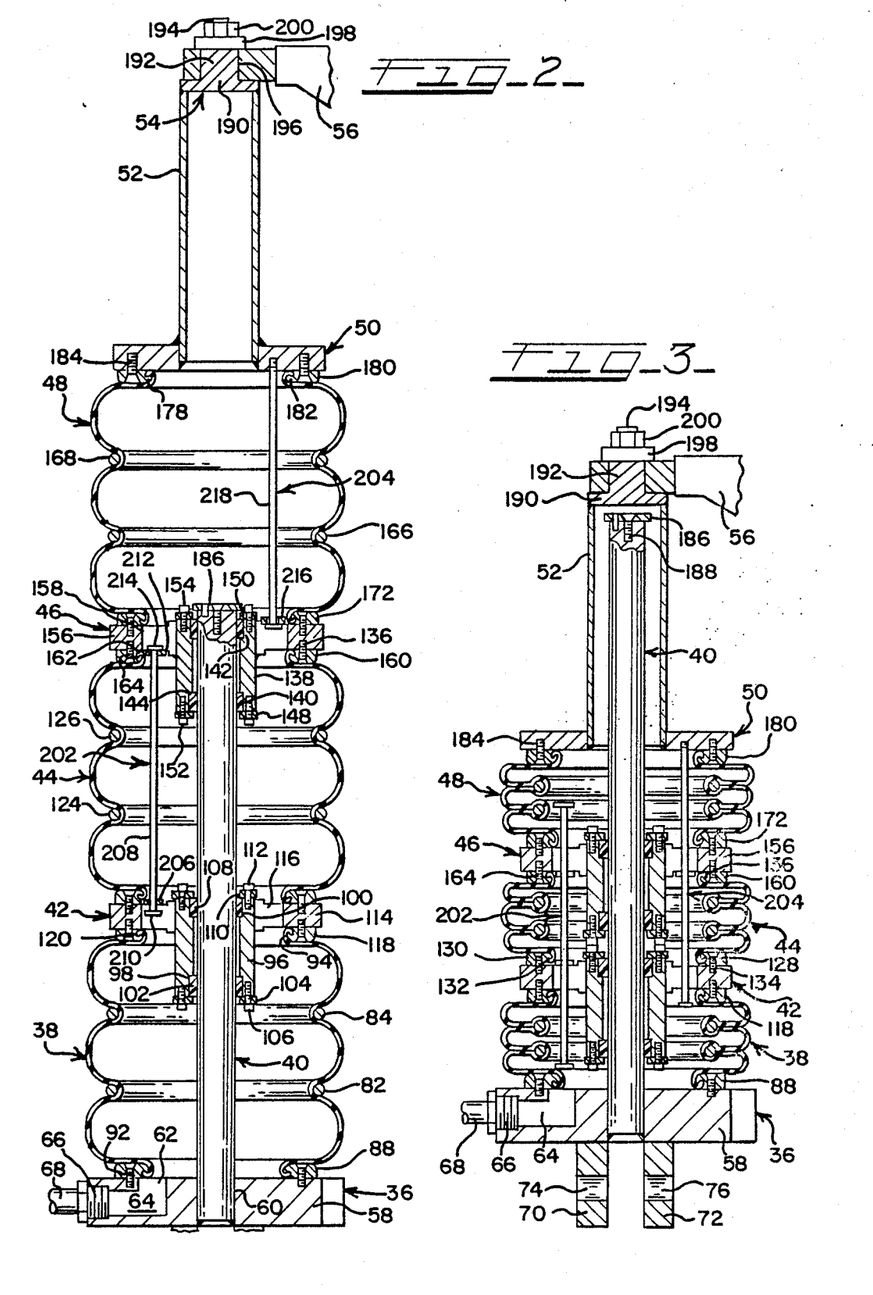
FIG. 2 is an enlarged cross sectional view of one of the single action cylinders shown in FIG. 1 showing three stacked actuators of the single action cylinder in a fully extended attitude.
FIG. 3 is an enlarged cross sectional view of one of the single action cylinders of FIG. 1 showing the three stacked actuators in a compressed attitude.
Figure 4:
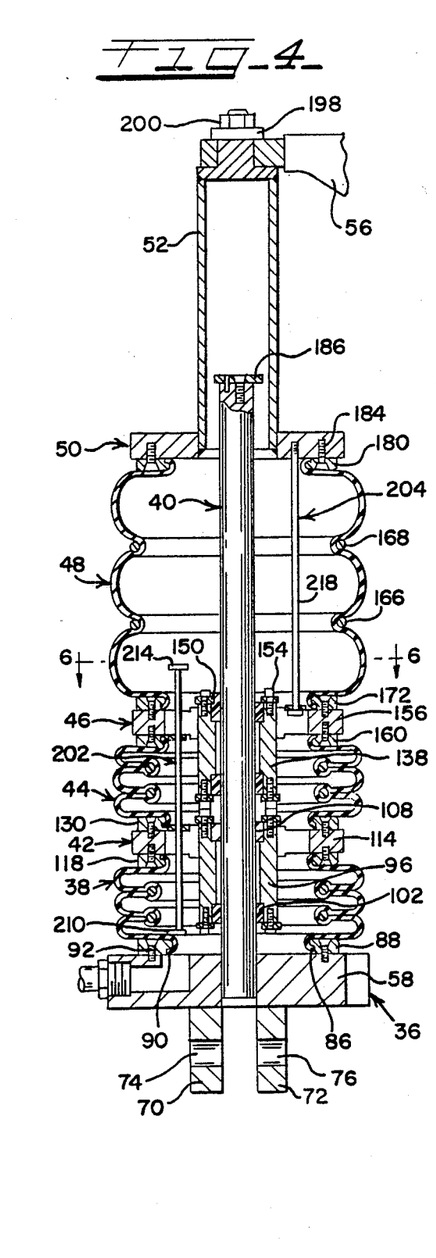
FIG. 4 is an enlarged cross sectional view of one of the single action cylinders of FIG. 1, but showing two of the stacked actuators compressed and one of the actuators in an extended position.

Single action cylinder 34 includes a base 36 with a first actuator 38 having one end sealingly connected to the base. A guide or guide post 40 is sealingly welded to base 36 and has a guide follower 42 slideably mounted thereon. Actuator 38 has its other end sealingly connected to the guide follower. A second actuator 44 has one end sealingly attached to guide follower 42 to stack actuator 44 over actuator 38. A second guide follower 46 is slideably mounted on guide post 40 and is sealingly connected to an opposite end of actuator 44. A third actuator 48 has one end sealingly connected to guide follower 46 and the other end connected to a top plate 50 to stack actuator 48 over actuator 44. Guide post 40 in cooperation with guide followers 42 and 46 keeps stacked actuators 38, 44 and 48. A pipe 52 has one end sealingly welded to top plate 50. A cap connector 54 is sealingly secured to the other end of pipe 52. Cap connector 54 is connected to an ear 56 which is fixed to ram 26 to move with the ram so that pipe 52 moves with the ram.

Base 36 includes a base plate 58 which has a post aperture 60 in its center fixedly receiving guide post 40. A vertical port 62 formed through the upper surface of the base plate and communicates with a radial port 64 which opens into a threaded portion 66. A conventional conduit 68 is mounted in the threaded portion 66. Conduit 68 is connected to a conventional surge tank which is not shown herein.

Base 36 is pivotally attached to bed 24 and thus frame 22 through a pair of ears 70 and 72 which have pin apertures 74 and 76, respectively, formed therein. A pivot pin 78 is mounted in the ears 70 and 72 and extends through an opening in a bed ear 80 to complete pivotal attachment of base 36 to bed 24.

Actuator 38 is a conventional open ended longitudinally extendable resilient actuator having three convolutions with girdle hoops 82 and 84 positioned between adjacent convolutions. Actuator 38 includes an annular bead 86 defining one open end of the actuator. A bead clamp ring 88 includes an annular bead groove 90 and receives the bead 86 therein. A plurality of hold down screws 92 secure the bead clamp ring to base plate 58 and thereby sealingly secure one end of actuator 38 to base 36. The other end of actuator 38 is also open ended and is defined by an annular bead 94 which is identical to bead 86.

Guide follower 42 includes a guide tube or sleeve 96 which has a pair of guide ring grooves 98 and 100 formed therein. A low friction plastic guide ring 102 is mounted in groove 98 and slideably engages guide post 40. The plastic material of guide ring 102 is in this instance tetrafluoroethylene fluorocarbon polymer; however, any other suitable low friction material such as a graphite filled material may be used instead. A retainer ring 104 is secured to the lower end of tube 96 by a plurality of screws 106 to hold guide ring 102 in its groove. A like guide ring 108 is mounted in groove 100 in sliding engagement with guide post 40. A retainer ring 110 is secured to the other end of tube 96 by a plurality of screws 112 to hold the retainer ring in position and to hold guide ring 108 in its respective groove. A connector plate or guide plate 114 is welded to tube 96. The connector plate has a pair of opposed mounting sides or surfaces and four identical ports 116 formed therein to allow air to flow between actuators 38 and 44. Ports 116 are equiangularly spaced about the center of the connector plate.

A bead clamp ring 118 identical in construction to bead clamp ring 88 includes an annular bead groove 120 which receives bead 94 of actuator 38. A plurality of conventional hold down screws 122 secure bead clamp ring 118 to one side of connector plate 114 for sealingly connecting one end of actuator 38 to connector plate 114.

Actuator 44 has an identical construction to actuator 38 in that actuator 44 is a conventional open ended longitudinally extendable resilient actuator. Actuator 44 also has three convolutions with girdle hoops 124 and 126 between convolutions. Actuator 44 includes an annular bead 128. A bead clamp ring 130 identical to bead clamp ring 118 includes an annular bead groove 132 which receives bead 128. A plurality of hold down screws 134 secure bead clamp ring 130 to connector plate 114 and thereby sealingly connect one end of actuator 44 to connector plate 114. The other end of actuator 44 is also open ended and is defined by an annular bead 136.

Guide follower 46 is identical to guide follower 42. Guide follower 46 includes a guide tube or sleeve 138 having a pair of guide ring grooves 140 and 142. Plastic guide rings 144 and 146 are mounted in grooves 140 and 142, respectively. The material of guide rings 144 and 146 is also tetrafluoroethylene fluorocarbon polymer, but any other suitable material may be used. Retainers 148 and 150 hold rings 144 and 146 in the respective grooves. Retainer 148 is secured into position by a plurality of conventional screws 152, and retainer 150 is secured into position by a plurality of conventional screws 154. A connector plate or guide plate 156 is welded to guide tube 138. Connector plate 156 has a pair of opposed mounting sides or surfaces and four identical ports 158 formed therein. Ports 158 are equiangularly spaced about the center of connector plate 156. A bead clamp ring 160 identical to bead clamp ring 130 and having an annular bead groove 162 which receives annular bead 136 is secured to one side of connector plate 156 by a plurality of identical hold down screws 164.

Actuator 48 is identical in construction to actuators 38 and 44 and is a conventional open ended longitudinally extendable resilient actuator. Actuator 48 includes three convolutions with girdle hoops 166 and 168 between adjacent convolutions. Actuator 48 includes an annular bead 170 which defines one end of the actuator. A bead clamp ring 172 identical to bead clamp ring 130 includes an annular bead groove 174 which receives bead 170. A plurality of conventional hold down screws 176 secure the bead clamp ring to connector plate 156 and sealingly connect one end of actuator 48 to connector plate 156. Actuator 48 includes an annular bead 178 on its other end. A bead clamp ring 180 identical to bead clamp ring 172 includes an annular bead groove 182 and receives bead 178. A plurality of hold down screws 184 connect bead clamp ring 180 to top plate 50 to connect sealingly the open end of actuator 48 to the top plate.

A guide post stop 186 is secured to the end of the guide post 40 by a conventional screw 188.

Cap connector 54 has a base portion 190 which is sealingly secured to pipe 24. Base portion 190 has a body portion 192 formed integral therewith and a threaded portion 194 formed integral with the body portion. Ear 56 includes an aperture 196 which receives body portion 192. A washer 198 is mounted on threaded portion 194, and a nut 200 is threadedly mounted on threaded portion 194 to secure the cap connector to ear 56. The end of pipe 52 is secured to ram 26 for affecting reciprocation of the ram in the frame.

A pair of identical connector assemblies 202 interconnect guide followers 42 and 46. Only one of the connector assemblies is shown in FIG. 2. A second pair of connector assemblies 204 interconnect guide follower 46 with top plate 50. Only one of the connector assemblies 204 is shown in FIG. 2.

As may be seen in FIG. 2, a connector stop plate 206 is secured on one side of port 116. An elongated connector rod 208 is slideably mounted in connector stop plate 206. Rod 208 has a connector bar 210 secured on one end. Bar 210 is engageable with plate 206 to limit movement of rod 208 in one direction. A second connector stop plate 212 is welded over port 158 of connector plate 156. Rod 208 is slideably mounted in connector stop plate 212. A second connector bar 214 is fixed to the other end of rod 208 to keep the rod in connector stop plate 212.

Connector assembly 204 includes a connector stop plate 216 which is welded onto connector plate 156 over one of the ports 158. An elongated connector rod 218 is slideably mounted in connector stop plate 216, and rod 218 has a connector bar 220 fixed thereon. The other end of rod 218 is threadedly mounted in top plate 50.

Figure 5:
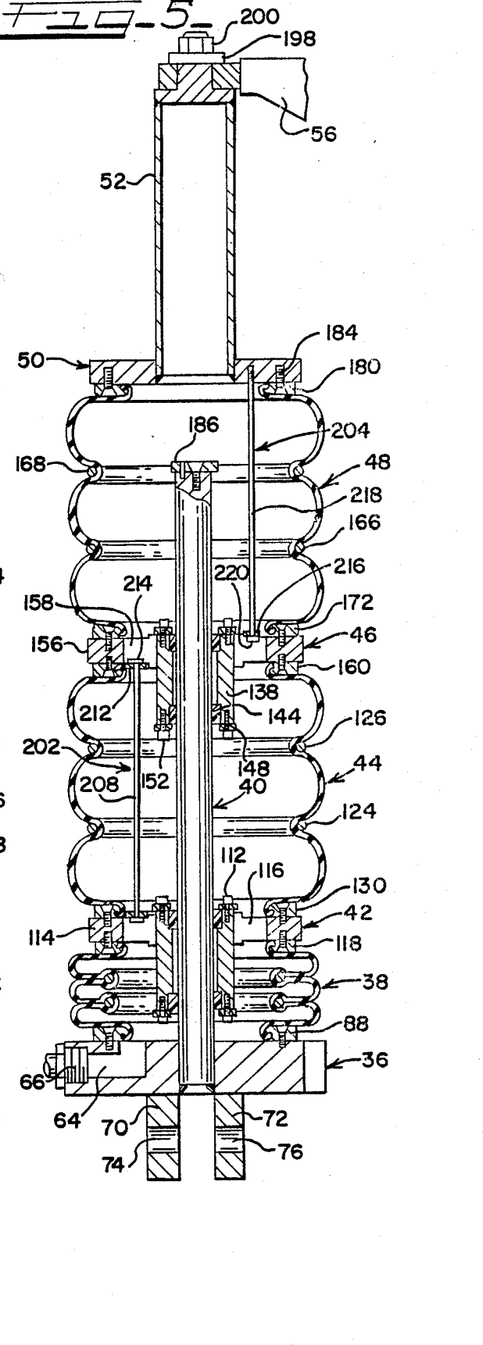
FIG. 5 is an enlarged cross sectional view of a single action cylinder of FIG. 1 similar to FIG. 4, but showing one actuator compressed and two of the actuators in an extended attitude.
Figure 6:
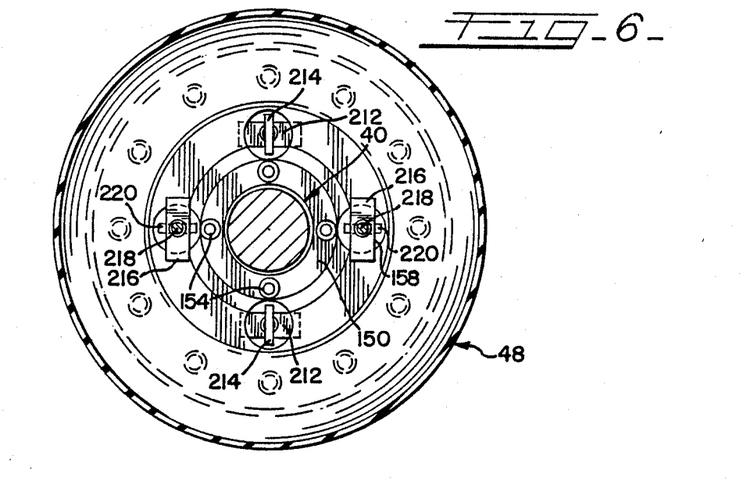
FIG. 6 is an enlarged cross sectional view taken on Line 6—6 of FIG. 4 showing a portion of a connector plate and portions of connector assemblies.
Figure 7:
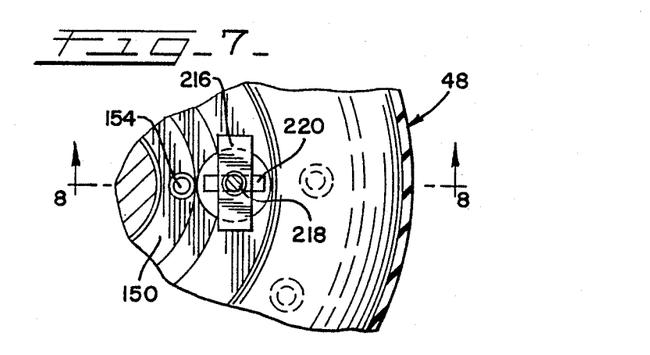
FIG. 7 is an enlarged fragmentary view of a portion of FIG. 6 showing a portion of a connector assembly in a port of a connector plate.
Figure 8:
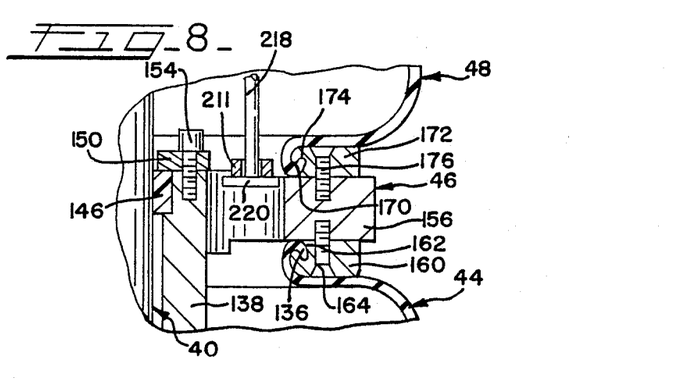
FIG. 8 is an enlarged cross sectional view taken on Line 8—8 of FIG. 7.

When ram 26 is in a lowered position, the single action cylinder is compressed to the attitude shown in FIG. 3, that is, actuators 38, 44 and 48 are compressed. As ram 26 starts to rise, movement of the ram pulls up on cap connector 54 to raise top plate 50 and thereby expand actuator 48 to the attitude shown in FIG. 4. Further movement of ram 26 in an upward direction causes connector rods 218 to pull up connector bars 220 into engagement with connector stop plates 216 and thereby move guide follower 46 upward to expand actuator 44. Guide follower 46 moves axially along guide post 40 inasmuch as guide rings 144 and 146 ride on the guide post until the two actuators are fully extended as shown in FIG. 5. Further upward movement of ram 26 causes connector rods 208 to pull up guide follower 42. Connector bars 214 attached to connector rods 208 engage connector stop plates 212 and connector bars 210 contact their respective connector stop plates 206 so that further upward movement of the ram causes guide follower 42 to be pulled upward and thereby expand actuator 38 until actuator 38 is fully extended as shown in FIG. 2.

When ram 26 reaches its uppermost position, it then starts to descend and ear 56 pushes down on pipe 52 to compress the three actuators. Actuator 48 has its lower open end in communication with the upper open end of actuator 44 through ports 158 in connector plate 156. Actuator 44 has its lower open end communicating with the upper open end of actuator 38 through ports 116 in connector plate 114. The lower open end of actuator 38 communicates with a surge tank through base 36 and conduit 68. Actuators 38 and 44 have their movement limited by guide followers 42 and 46. The lower end of actuator 38 is secured to base 36 and is fixed to the press. The lower end of actuator 48 is secured to guide follower 46, however the upper end of actuator 48 has a free range of movement transverse to guide post 40. This free range of movement of the upper end of actuator 48 allows the single action cylinder to accommodate itself to any misalignment between guide post 40 and the direction of movement of ram 26 in the frame even wobbles of the ram in the frame are accommodated by the present single action cylinder.

In prior art constructions where the single action cylinder is not perfectly aligned with the direction of movement of the ram within the frame, extraneous forces are placed on both the frame and parts of the single action cylinder causing undue wear to both parts of the single action cylinder as well as parts of the press. The present construction allows the single action cylinder to make adjustments in the interconnection between the single action cylinder and parts of the press. Although the stroke of the single action cylinder follows the full stroke of the ram, only a portion of the single action cylinder is guided. In order to achieve effective operation of the single action cylinder, a portion of the cylinder is free to make adjustments for machining accuracies and accuracies of alignment.

Figure 9:
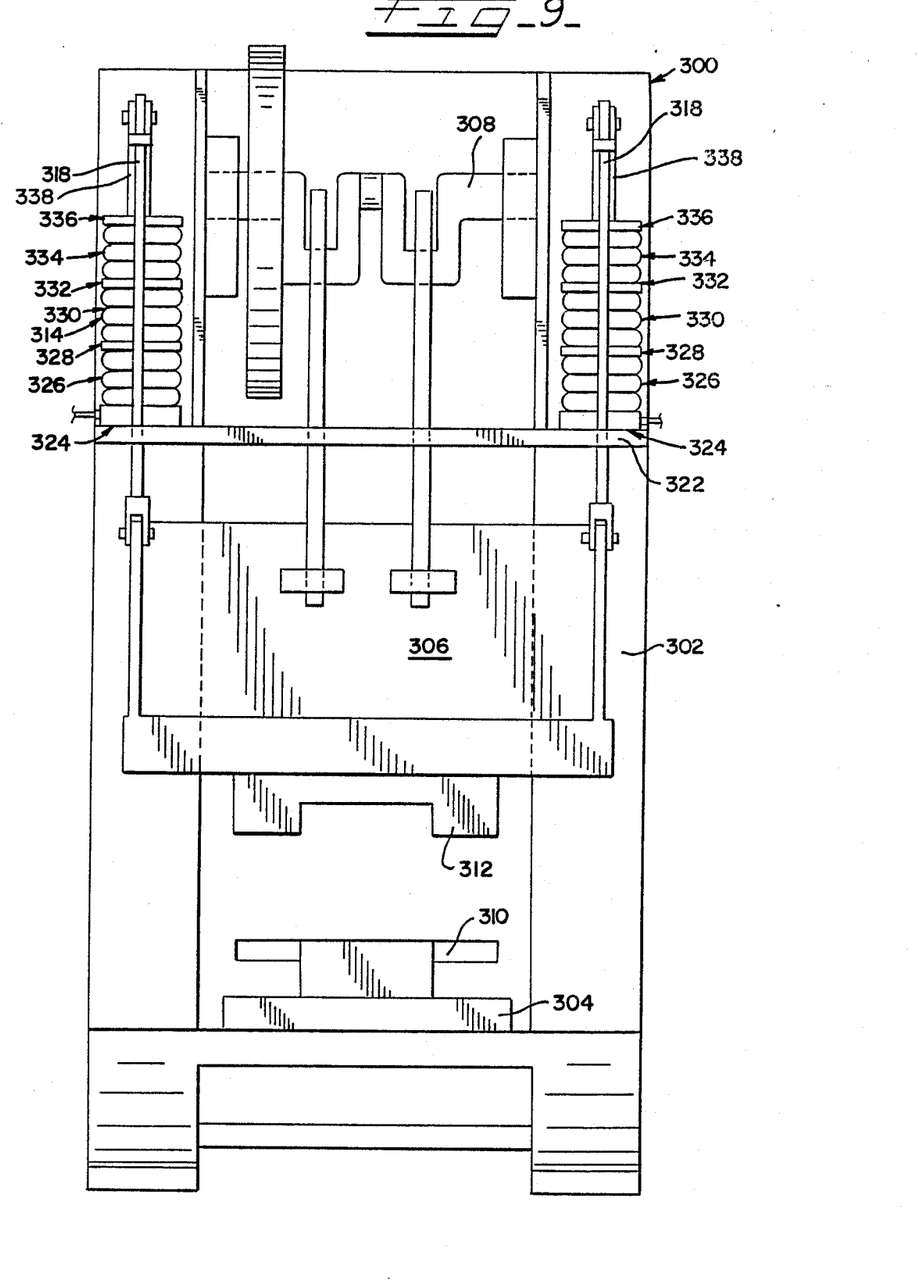
FIG. 9 is a front elevational view of a conventional press with a pair of pull down single action cylinders embodying the herein disclose invention mounted on the press.
Figure 10:
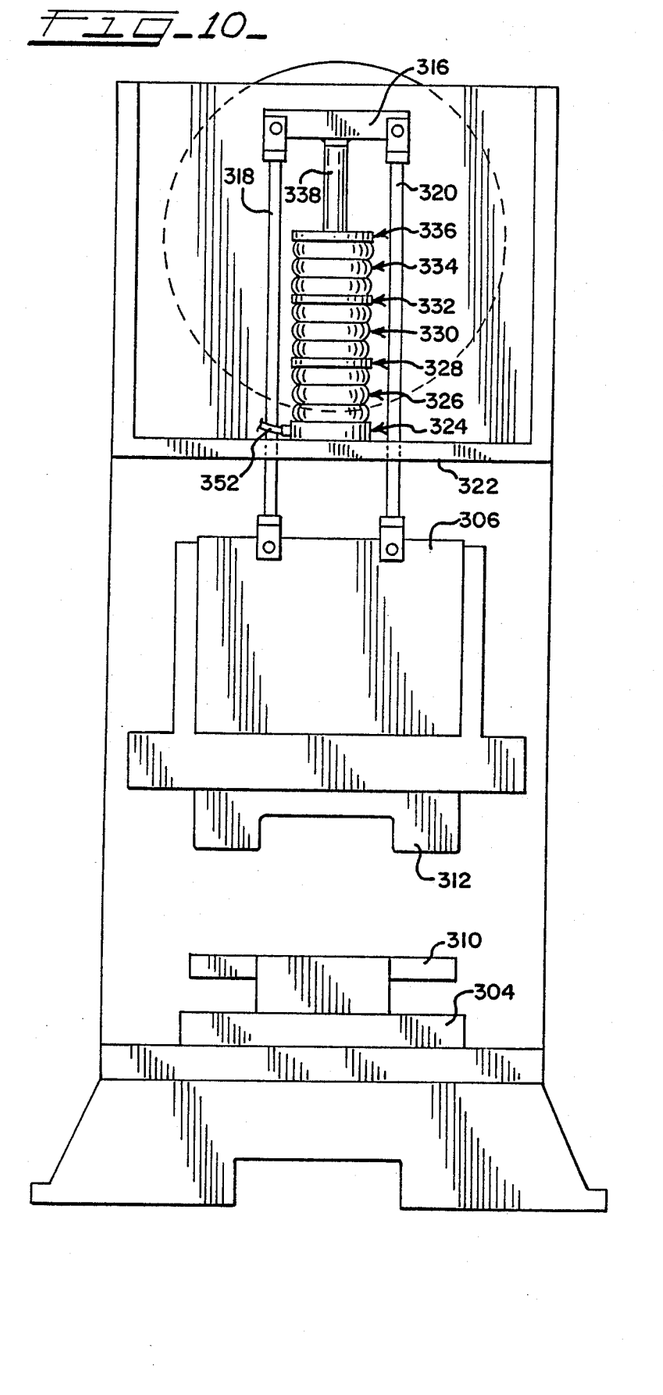
FIG. 10 is a side elevational view showing the connection of one of the single action cylinders of FIG. 9 with a movable portion of the press.

Turning now to FIGS. 9 and 10, a conventional power press 300 is shown therein. Power press 300 includes a frame 302 with a bed 304 fixed to the frame.

A ram 306 is reciprocally mounted in the frame. A crank shaft 308 is rotatably mounted in the frame and is connected to ram 306 to move the ram up and down. A lower portion of a die 310 is mounted on the bed and an upper portion of a die 312 is mounted on the ram. A pair of identical pull down single action cylinders 314, embodying the present invention, is connected to the frame and the ram of power press 300. Cylinders 314 affect the reciprocation of ram 306 in frame 302 whether the ram is moving up or down as is well known in the art.

Referring now to FIG. 10, it may be seen that pull down single action cylinder 314 is connected to a cross beam 316 which has pull rods 318 and 320 connected to opposite ends of the cross beam. The pull rods 318 and 320 have their lower ends connected to ram 306. Cylinder 314 is mounted on a platform 322 which is fixed to frame 302.

Referring now to FIGS. 11-15, the details of construction of cylinder 314 are shown therein. The cylinder generally includes a base 324 mounted on platform 322. A first actuator 326 has one end sealingly connected to base 324. A guide follower 328 is sealingly connected to the upper end of actuator 326. A second actuator 330 has its lower end sealingly connected to guide follower 328 to stack actuator 330 above actuator 326. A guide follower 332 is sealingly connected to the upper end of actuator 330. A third actuator 334 has its lower end sealingly connected to guide follower 332 to stack actuator 334 above actuator 330. A top plate 336 is sealingly connected to the upper end of actuator 334. A pipe 338 has its lower end sealingly welded to top plate 336 and its upper end sealingly welded to cap 340 which is welded to cross beam 316. A guide post 342 is sealingly welded to base 324 and has guide followers 328 and 332 slidingly mounted thereon.

Figure 11:
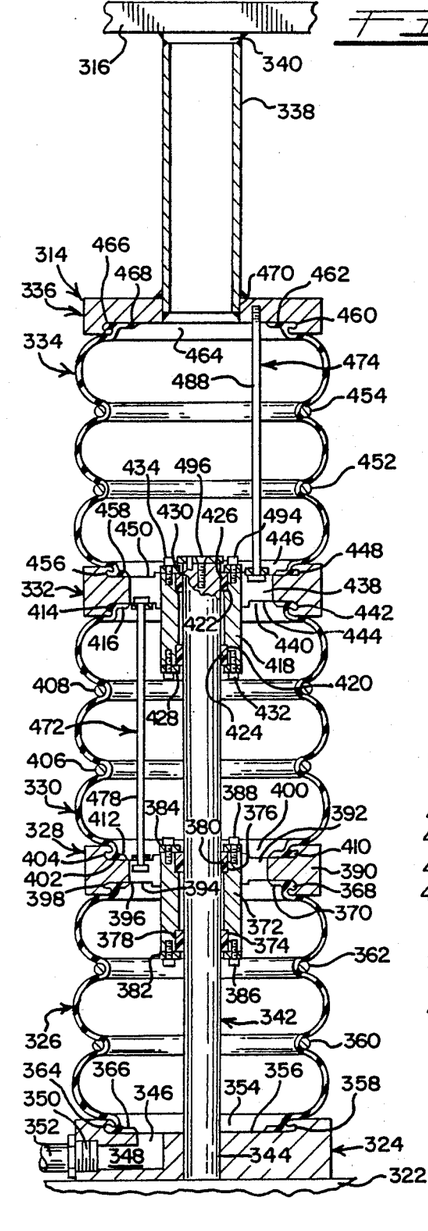
FIG. 11 is an enlarged cross sectional view of the single action cylinder of FIG. 9 showing all of the actuators in an extended position.

Base 334 includes a post aperture 344 which receives guide post 342. A vertical port 346 is formed through the upper surface of the base plate and communicates with a radial port 348 which opens into a threaded portion 350. A conduit 352 is threadedly mounted in threaded portion 350 and is connected to a conventional surge tank which is not shown herein. Base 324 has an actuator recess portion 354 which has a flat surface 356 and an annular bead groove 358.

Actuator 326 is an open ended longitudinally extendable resilient actuator having three convolutions with girdle hoops 360 and 362 positioned between adjacent convolutions. Actuator 326 includes an annular bead 364 on one end of the actuator. Bead 364 is sealingly mounted in bead groove 358. An annular lip 366 is formed integral with the bead and sealingly engages surface 356. Air pressure in the actuator holds the lip in engagement with the flat surface and the bead in its groove to secure that end of the actuator to the base. The other end of actuator 326 is also open ended and has an annular bead 368 and an annular lip 370 formed integral with bead 368.

Guide follower 328 is similar in construction to guide followers 42 and 46, however, guide follower 328 has a different means for receiving the ends of the respective actuators 326 and 330. Guide follower 328 includes a guide tube or sleeve 372 having a pair of guide ring grooves 374 and 376. Plastic guide rings 378 and 380 are mounted in grooves 374 and 376, respectively, in sliding engagement with guide post 342. The material of guide rings 378 and 380 is a tetrafluoroethylene fluorocarbon polymer but any other suitable low friction material may be used. Retainer rings 382 and 384 engage guide rings 378 and 380, respectively. Retainer ring 382 is held in position by a plurality of conventional hold down screws 386, and retainer ring 384 is held in position by conventional hold down screws 388. A connector plate 390 is welded to tube 372. Connector plate 390 has a pair of opposed mounting surfaces and four ports 392 equiangularly spaced about the center of the plate. Connector plate 390 includes an actuator recess 394 in a mounting surface with a flat portion 396 formed therein. An annular bead groove 398 is formed in the connector plate and sealingly receives bead 368 of actuator 326. Lip 370 of actuator 326 is in sealing engagement with flat surface 396 of the connector plate. Air pressure in the actuator holds the lip against the flat surface and bead 368 in groove 398 to secure actuator 326 to the guide follower.

Connector plate 390 has an actuator recess 400 with a flat surface 402 and an annular bead groove 404 communicating with the flat surface on the side opposite to actuator recess 394.

Actuator 330 has an identical construction to actuator 326 in that actuator 330 is an open ended longitudinally extendable resilient actuator. Actuator 330 includes three convolutions with girdle hoops 406 and 408 between the convolutions. Actuator 330 also includes an annular bead 410 which is mounted in annular bead groove 404. Actuator 330 also includes an annular lip 412 which is formed integral with bead 410 and sealingly engages flat surface 402. As with actuator 326, air pressure in actuator 330 holds the end of the actuator in sealing connection with the connector plate 390. Actuator 330 has on its other end a like annular bead 414 and an annual sealing lip 416 formed integral therewith to define an open end.

Guide follower 332 is identical to guide follower 328. Guide follower 332 includes a guide tube or sleeve 418 having a pair of ring grooves 420 and 422 with plastic guide rings 424 and 426 mounted in grooves 420 and 422, respectively. Guide rings 424 and 426 slidingly engage guide post 342. Guide rings 424 and 426 like rings 378 and 380 are also made of tetrafluoroethylene fluorocarbon polymer though any other low friction plastic may be used. Retainers 428 and 430 hold rings 424 and 426, respectively, in their respective grooves. Conventional screws 432 secure retainer 428 in place, and conventional screws 434 secure retainer 430 in place. A connector plate 436 is welded to tube 418. Connector plate 436 has four equiangularly spaced ports 438 spaced about the center of the plate. Connector plate 436 includes a pair of opposed mounting surfaces with an actuator recess 440 on one surface. Recess 440 includes an annular bead groove 442 and a flat sealing surface 444. Actuator 330 has its bead 414 sealingly mounted in bead groove 442 and annular sealing lip 416 sealingly engages flat surface 444. Connector plate 436 has an upper actuator recess 446 which includes a bead groove 448 and a flat sealing surface 450.

Actuator 334 is identical to actuators 326 and 330. Actuator 334 is an open ended longitudinally extendable resilient actuator having three convolutions with girdle hoops 452 and 454 between adjacent convolutions. Actuator 334 includes an annular bead 456 which is sealingly mounted in annular bead groove 448. Actuator 334 also includes an annular sealing lip 458 formed integral with bead 456 which lip sealingly engages flat surface 450. Actuator 334 has on its upper end an annular bead 460 with a sealing lip 462 formed integral therewith.

Top plate 336 has an actuator recess 464 with an annular bead groove 466 formed therein and a flat sealing surface 468 communicating with the annular bead groove 466. Annular bead 460 of actuator 334 is sealingly mounted in the annular bead groove 466 and lip 462 sealingly engages the flat sealing surface 468. Air pressure in actuator 334 holds the two ends of the actuator in sealing connection with connector plate 436 and top plate 336. Pipe 338 is sealingly welded in a pipe aperture 470 of the top cap.

Figure 12:
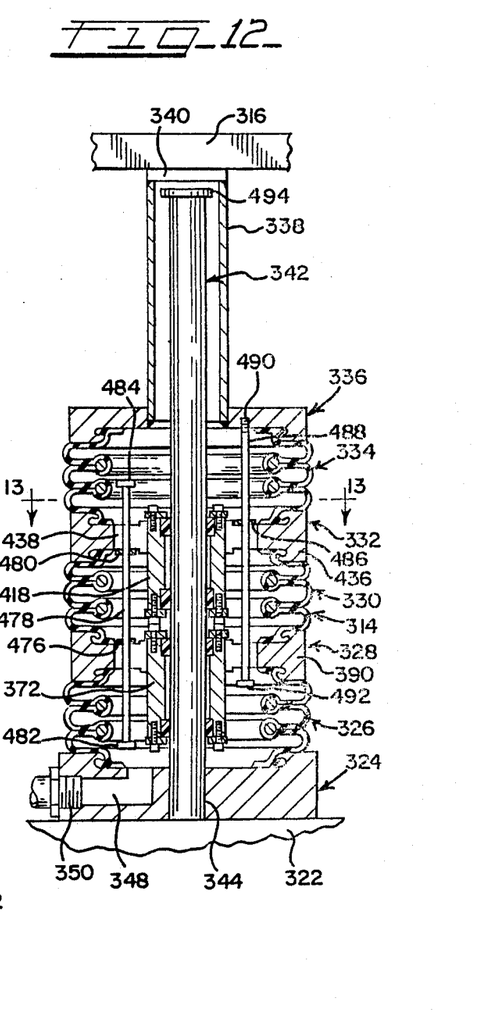
FIG. 12 is a cross sectional view of a single action cylinder of FIG. 9 showing all of the actuators in a compressed attitude.
Figure 13:
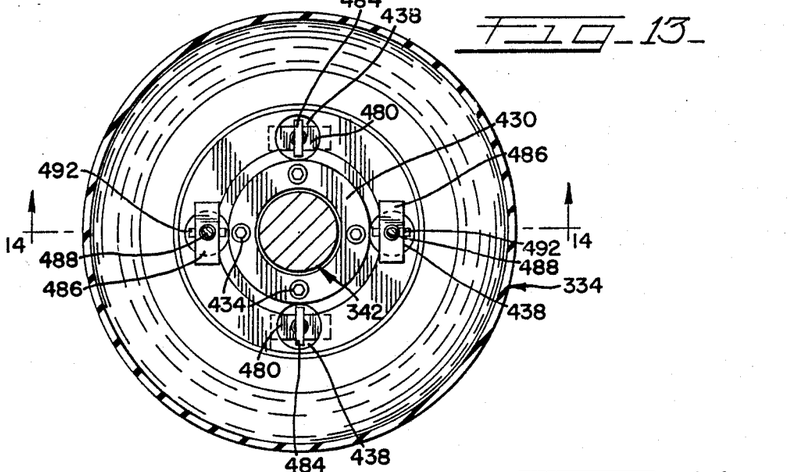
FIG. 13 is an enlarged cross sectional view taken on Line 13—13 of FIG. 12.
Figure 14:
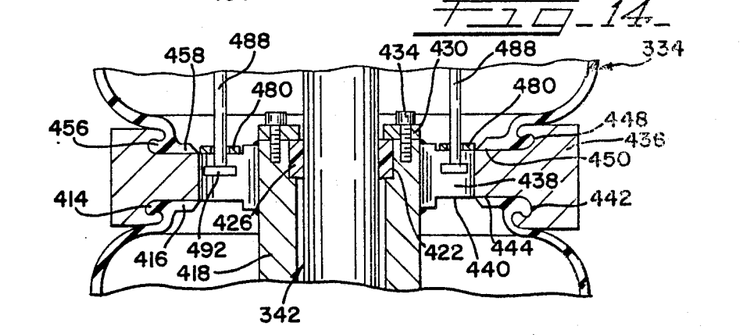
FIG. 14 is a cross sectional view taken on Line 14—14 of FIG. 13.
Figure 15:
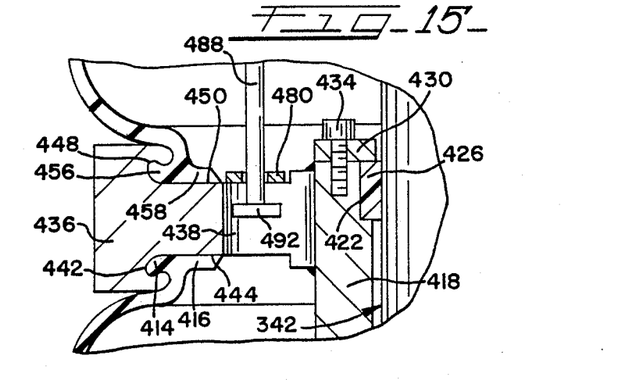
FIG. 15 is an enlarged fragmentary cross sectional view of a portion of FIG. 14.

A pair of identical connector assemblies 472 interconnect guide followers 328 and 332. Only one of the connector assemblies is shown in FIGS. 11 and 12. A second pair of connector assemblies 474 interconnects guide follower 332 with top plate 336. Only one of the connector assemblies 474 is shown in FIGS. 11 and 12.

As may be seen in FIGS. 11 and 12, connector assembly 472 includes a connector stop plate 476 fixed to flat surface 402 over port 392. The connector stop plate contains an aperture which slidingly receives an elongated connector rod 478. A connector stop plate 480 is secured to flat surface 444 over port 438. Rod 478 is also slidingly mounted in connector plate 480. Rod 478 has a connector bar 482 fixed to its lower end and a connector bar 484 connected to its upper end to keep both ends of the rod outside of the respective connector stop plates.

Connector assembly 474 includes a connector stop plate 486 welded to flat surface 450 of connector plate 436 over port 438. An elongated connector rod 488 is slidably mounted in connector stop plate 486. Connector rod 488 has a threaded end 490 threadedly mounted in top plate 336. The lower end of connector rod 488 has a connector bar 492 fixed thereon. Guide post 342 has a guide post stop 494 mounted on its upper end and held in position by a conventional screw 496.

In operation, when ram 306 is in its lowermost position, cylinder 314 is in the attitude shown in FIG. 12, that is, all of the actuators are compressed. As the ram 306 rises, it pushes up on rods 318 and 320 to push up the cross beam 316 and thus pull pipe 338 upward which carries with it top plate 336. As the top plate 336 moves upward, it extends actuator 334 until the actuator is fully extended. The connector assemblies 474 then are connected to guide follower 332 to pull the guide follower upward and thus pull upward actuator 330. When actuator 330 is fully extended, connector assemblies 472 pull guide follower 328 upward to extend actuator 326. As guide follower 332 moves upward, it is guided by guide post 342 as is guide follower 328 when it moves upward. This same guiding is not afforded to the upper portion of actuator 334 so that any misalignments between guide post 342 and the movement of the ram are accommodated since the upper end of actuator 334 is free to adjust itself relative to the frame. When the ram reaches the top of its stroke and starts to descend, the cross beam pushes down against pipe 338 and thus applies a load to actuators 326, 330 and 334. Any excess air is expelled through conduit 352 to the surge tank which is not shown herein. Guide followers 328 and 332 are guided on the guide post while the upper end of actuator 334 may adjust itself to any misalignments.

From the foregoing description, it may be seen that the single action cylinder described hereinabove affect the reciprocation of moving parts in a machine without introducing any extraneous loadings on the parts since the cylinders are designed to include a compensation for any misalignments.

Although specific embodiments of the herein disclosed invention have been described in detail above, it is readily apparent that those skilled in the art may make various modifications and changes without departing from the spirit and scope of the present invention. It is to be expressly understood that the instant invention is limited only by the appended claims.

What is claimed is:

1. A single action cylinder for affecting reciprocation between a first part and a second part having reciprocating motion relative to each other in a machine comprising, a base adapted for attachment to said first part, a plurality of open ended longitudinally extendable resilient actuators stacked one above the other, a first actuator of said actuators having one end connected to the base, each of said actuators having an open end interconnected to an open end of an adjacent actuator to allow a fluid to flow from one actuator to another, a second actuator of said actuators having one end connected to means for attaching said second actuator to said second part, and an elongated guide connected to either the first or second of said actuators to limit movement of that actuator in a direction transverse to the length of the guide, another one of said actuators having one end free to move in all directions relative to said guide, whereby freedom of movement of said one end of said another one of said actuators allows the cylinder to affect reciprocation between the first part and the second part without creating extraneous loadings on said first and second parts because of imperfect alignment between the first and second parts and the single action cylinder.

2. A single action cylinder for affecting reciprocation between a first part and a second part having reciprocating motion relative to each other in a machine as defined in claim 1, including a connector assembly connected to one of the actuators and to an adjacent actuator to move the adjacent actuator when the first mentioned one actuator is extended a given amount.

3. A single action cylinder for affecting reciprocation between a first part and a second part having reciprocating motion relative to each other in a machine as defined in claim 1, wherein the elongated guide is a guide post which is receivable through the center of each of the actuators, and a guide follower connected to one end of said actuator connected to said guide, said guide follower being slideably engageable with the guide post limiting movement of that one end of that actuator to movement along the guide post.

4. A single action cylinder for affecting reciprocation between a first part and a second part having reciprocating motion relative to each other in a machine as defined in claim 1, including, a connector plate connected to open ends of each o a pair of adjacent actuators connecting the adjacent actuators to each other, said connector plate having a port to allow fluid to flow between the adjacent actuators.

5. A single action cylinder for affecting reciprocation between a first part and a second part having reciprocating motion relative to each other in a machine as defined in claim 1, including a connector plate connected to an open end of each of adjacent actuators connecting each of the adjacent actuators to each other, said connector plate having a port to allow fluid to flow between adjacent actuators, and a connector assembly connected to one of the actuators and to an adjacent actuator to move the adjacent actuator when the first mentioned actuator is extended a given amount.

6. A single action cylinder for affecting reciprocation between a first part and a second part having reciprocating motion relative to each other in a machine as defined in claim 1, wherein the elongated guide is a guide post receivable through the center of the actuators, said actuator connected to said guide having one end connected to a guide sleeve slideably engageable with the guide post limiting movement of the one end of the actuator to movement along the guide post, and a connector plate secured to the guide sleeve and connected to an open end of said actuator and to an adjacent actuator connecting the adjacent actuators to each other, said connector plate having a port to allow fluid to flow between the adjacent actuators.

7. A single action cylinder for affecting reciprocation between a first part and a second part having reciprocating motion relative to each other in a machine as defined in claim 1, wherein the elongated guide is a guide post receivable through the center of the actuators, said actuator connected to the guide having one end connected to a guide sleeve slideably engageable with the guide post limiting movement of the one end of said actuator to movement along the guide post, and a connector assembly connected to one of the actuators and to an adjacent actuator to move the adjacent actuator when the one actuator is extended a given amount.

8. A single action cylinder for affecting reciprocation between a first part and a second part having reciprocating motion relative to each other in a machine as defined in claim 1, wherein the elongated guide is a guide post receivable through the center of the actuators, said actuator connected to the guide having one end connected to a guide sleeve slideably engageable with the guide post limiting the movement of the one end of the actuator to movement along the guide post, a connector plate fixed to the guide sleeve and connected to an open end of said actuator and to an adjacent actuator connecting the open ends of the adjacent actuators to each other, said connector plate having a port to allow fluid to flow between adjacent actuators, and a connector assembly connected to one of the actuators and to an adjacent actuator to move the adjacent actuator when the one actuator is extended a given amount.

9. A single action cylinder for affecting reciprocation between a first part and a second part having reciprocating motion relative to each other in a machine as defined in claim 1, including a guide follower slideably mounted on the guide, said guide follower having a tube slideably mounted on the guide, and a connector plate having opposed sides fixed to the tube, one of said actuators having its open end sealingly connected to one side of the connector plate, another of said actuators having its open end connected to the other side of the connector plate, said connector plate having a port extending therethrough to allow fluid to flow between the actuators through the connector plate.

10. A single action cylinder for affecting reciprocation between a first part and a second part having reciprocating motion relative to each other in a machine as defined in claim 1, wherein the elongated guide is a guide post receivable through the center of the actuators, a guide follower slideably mounted on the guide post, said guide follower having a tube mateably receiving the guide post, a guide ring mounted in the tube and slideably engaging the guide post, a connector plate fixed to the tube, said connector plate having a pair of opposed mounting sides, a bead clamp ring secured to one mounting side of the connector plate, one of said actuators having an annular bead secured to the connector plate by said bead clamp ring, a second bead clamp ring secured to the other mounting side of the connector plate, another of said actuators having an annular bead secured to the other mounting side of the connector plate by the second bead clamp ring, said connector plate including a port to allow fluid to flow between one actuator and another actuator connected to the connector plate.

11. A single action cylinder for affecting reciprocation between a first part and a second part having reciprocating motion relative to each other in a machine as defined in claim 1, wherein said means for attaching said second actuator to said second part includes a top plate sealingly attached to said one end of said second actuator, a pipe having one end fixed to the top plate, said top plate including an aperture communicating with the interior of the pipe, whereby the elongated guide may enter the pipe when the actuators are compressed.

12. A single action cylinder for affecting reciprocation between a first part and a second part having reciprocating motion relative to each other in a machine as defined in claim 1, wherein the elongated guide is a guide post receivable through the center of the actuators, a guide sleeve slideably engageable with the guide post and being connected to the actuator limiting movement of the actuator to movement along the guide post, a connector plate fixed to the guide sleeve, said connector plate having a pair of opposed mounting sides, a bead clamp ring mounted on one mounting side of the connector plate, one of said actuators having an annular bead secured to said one mounting side of the connector plate by the bead clamp ring, a second bead clamp ring secured to the other mounting side of the connector plate, and said another actuator having an annular bead connected to the other mounting side of the connector plate by the second bead clamp ring, said connector plate having a port to allow fluid to flow between the actuators connected by the connector plate.

13. A single action cylinder for affecting reciprocation between a first part and a second part having reciprocating motion relative to each other in a machine as defined in claim 1, wherein the elongated guide is a guide post receivable through the center of the actuators, a connector plate connected to each of adjacent actuators connecting the adjacent actuators to each other, said connector plate having a port to allow fluid to flow between adjacent actuators, said means for attaching said second actuator to said second part including a top plate sealingly attached to the open end of the second actuator, a pipe having one end sealingly connected to the top plate, said top plate including an aperture opening into the interior of the pipe, said pipe having its other end adapted for attachment to the second part, whereby said guide post has a portion extending into the pipe when the actuators are compressed.

14. A single action cylinder for affecting reciprocation between a first part and a second part having reciprocating motion relative to each other in a machine as defined in claim 1, wherein the elongated guide is a guide post having one end fixed to the base and being substantially perpendicular to the base, said guide post receivable through the center of the actuators, a tube mateably mounted on the guide post, a guide ring mounted in the tube and slideably engageable with the guide post, a connector plate fixed to the tube, said connector plate having a pair of opposed mounting sides, a bead clamp ring fixed to one mounting side of the connector plate, one of said actuators having an annular bead at one open end sealingly secured to the connector plate by said bead clamp ring, a second bead clamp ring fixed to the other mounting side of the connector plate, the another actuator having an annular bead on an open end sealingly connected to the other mounting side of the connector plate by the second bead clamp ring, said connector plate having a port to allow fluid to flow between the actuators connected by the connector plate, said means for attaching said second actuator to said second part including a top plate sealingly connected to said one end of the second actuator, a pipe having one end sealingly fixed to the top plate, said top plate having an aperture communicating with the interior of the pipe, the other end of the pipe being adapted for attachment to the second part, whereby said guide post is positionable in the pipe when the actuators are compressed.

15. A single action cylinder for affecting reciprocation between a first part and a second part having reciprocating motion relative to each other in a machine as defined in claim 1, wherein the elongated guide is a guide post having one end fixed to the base and being substantially perpendicular to the base, said guide post receivable through the center of the actuators, a connector plate connected to open ends of each adjacent actuators connecting the adjacent actuators to each other, said connector plate having a port to allow fluid to flow between adjacent actuators, said means for attaching said second actuator to said second part including a top plate sealingly connected to said one end of the second actuator, a pipe having one end sealingly secured to the top plate, said top plate having an aperture communicating with the interior of the pipe, said pipe having its other end adapted for attachment to said second part, a connector rod having one end fixed to the top plate and extending through the port, a connector bar fixed to the other end of the connector rod and being connectable to the connector plate, whereby the connector bar connects to the connector plate to move the one actuator when the other actuator is extended a given amount.

16. A single action cylinder for affecting reciprocation between a first part and a second part having reciprocating motion relative to each other in a machine as defined in claim 1, including a connector plate movably connected to the guide for movement along the guide, said connector plate having a pair of substantially flat opposed mounting surfaces, one of said mounting surfaces including an annular bead groove and a substantially flat lip sealing surface adjacent to the annular bead groove, said one of the actuators having on its open end an annular bead groove having a sealing lip formed integral therewith, the annular bead positioned in the annular bead groove of the connector plate and the sealing lip sealingly engaging the sealing surface for sealingly connecting the one actuator to the one side of the connector plate, said connector plate having a second annular bead groove on its other mounting surface and a second sealing surface formed integral with the annular bead groove, said other actuator having an annular bead on its open end and an annular sealing lip formed integral with the bead, said annular bead of the other actuator being positioned in the second annular bead groove of the connector plate and the sealing lip of the other actuator in sealing engagement with the second sealing surface for sealing connection of the other actuator with the connector plate, and said connector plate having a port to allow fluid to flow between actuators connected to the connector plate.

17. A single action cylinder for affecting reciprocation between a first part and a second part having reciprocating motion relative to each other in a machine as defined in claim 1, wherein the elongated guide is a guide post receivable through the center of the actuators, a guide tube mateably mounted on the guide post, a connector plate fixed to the guide tube and movable therewith, said connector plate having a pair of opposed substantially flat mounting surfaces, one of said mounting surfaces of the connector plate including an annular bead groove and a sealing surface communicating therewith, one actuator having an annular bead on its open end and a sealing lip formed integral therewith, said annular bead of the actuator being sealingly mounted in the annular bead groove of the connector plate and the annular lip in sealing engagement with the sealing surface for sealing connection to the connector plate, said connector plate having on its other mounting surface a second annular bead groove and a second sealing surfaced formed integral therewith, said another actuator having an annular bead and an annular lip formed integral therewith, said annular bead of the another actuator being sealingly mounted in the second annular bead groove of the connector plate and the annular lip of the another actuator being in sealing contact with the second sealing surface for connection of the another actuator to the connector plate, and said connector plate having a port to allow fluid to flow between the actuators connected to the connector plate.

18. A single action cylinder for affecting reciprocation between a first part and a second part having reciprocating motion relative to each other in a machine as defined in claim 1, wherein the elongated guide is a guide post receivable through the center of the actuators, a connector plate movably mounted along the guide post, said connector plate having a pair of opposed substantially flat annular mounting surfaces, said connector plate having in one of its mounting surfaces an annular bead groove and a sealing surface formed therewith, said one of the actuators having an annular bead on an open end and an annular lip formed integral therewith, said annular bead being sealingly positioned in the annular bead groove of the connector plate and the annular lip in sealing engagement with the sealing surface to connect sealingly the actuator to the connector plate, said other mounting surface including a second annular bead groove and a second sealing surface, said another actuator having an annular bead formed integral therewith and an annular lip formed integral with the annular bead, said annular bead being positioned in the second annular bead groove and the annular lip being in sealing engagement with the second sealing surface for sealing connection of one end of the another actuator to the connector plate, said means for attaching said second actuator to said second part including a top plate sealingly fixed to said one end of the second actuator, a pipe having one end sealingly fixed to the top plate, said top plate having an aperture communicating with the interior of the pipe, said pipe having its other end adapted for attachment to said second part, said guide post having a portion positionable in the pipe when the actuators are compressed.

19. A single action cylinder for affecting reciprocation between a first part and a second part having reciprocating motion relative to each other in a machine as defined in claim 1, wherein the elongated guide is a guide post receivable through the center of the actuators, a connector plate movably mounted on the guide post, said connector plate having a pair of opposed substantially flat mounting surfaces, one of the mounting surfaces of the connector plate having an annular bead groove and a substantially flat lip sealing surface, said one of said actuators having an annular bead on one end and an annular lip formed integral with the bead, said annular bead of the one actuator being sealingly mounted in the annular bead groove of the connector plate and the annular lip in sealing engagement with the lip sealing surface for sealingly securing the actuator to the connector plate, the other mounting surface of the connector plate having a second annular bead groove having a second lip sealing surface, said another actuator having an annular bead and an annular lip formed integral with the bead, said annular bead of the another actuator positioned in the second annular bead groove and the annular lip of the another actuator in sealing engagement with the second lip sealing surface for sealingly securing the another actuator to the other mounting surface of the connector plate, said connector plate having a port to allow fluid to flow between the actuators connected to the connector plate, said means for attaching said second actuator to said second part including a top plate sealingly secured to said one end of the said second actuator, a pipe having one end sealingly fixed to the top plate, said top plate having an aperture communicating with the interior of the pipe, said guide post having a portion positionable in the pipe when the actuators are compressed, said pipe having its other end adapted for attachment to said second part, a connector rod having one end fixed to the top plate and said connector rod extending through the port, a connector bar fixed to the other end of the connector rod and connectable with the connector plate, whereby expansion of the second actuator causes the top plate to move a given amount from the connector plate results in connection of the connector bar with the connector plate to move the first actuator 20. A single action cylinder for affecting reciprocation between a first part and a second part having reciprocating motion relative to each other in a machine comprising, a base adapted for attachment to said first part, said base being adapted for connection to a surge tank, a guide post having one end fixed to said base and being substantially perpendicular to the base, a first bead clamp ring secured to the base, a first open ended longitudinally extendable resilient actuator having an integral annular bead defining a first open end, said annular bead connected to the bead clamp ring being sealingly secured to the base, a guide tube mateably mounted on the guide post, a guide ring mounted in the guide tube and slideably engaging the guide post, a connector plate fixed to the guide tube, said connector plate having a pair of substantially flat opposed mounting surfaces, a second bead clamp ring secured to one of the mounting surfaces of the connector plate, said first actuator having a second integral annular bead defining a second open end, said second annular bead being connected to the second bead clamp ring and securing the second open end of the first actuator to the connector plate, a third bead clamp ring mounted on the other mounting surface of the connector plate, a second open ended longitudinally extendable resilient actuator having an integral annular bead defining a first open end, said annular bead of the second actuator being in sealing engagement with the third bead clamp ring sealingly securing the first open end of the second actuator to the connector plate, said connector plate having a port to allow fluid to flow between the first actuator and the second actuator, a second guide tube mateably mounted on the guide post, a second guide ring mounted in the second guide tube in sliding engagement with the guide post, a second connector plate fixed to the second guide tube, said second connector plate having a pair of opposed substantially flat mounting surfaces, a fourth bead clamp ring mounted on one of the mounting surfaces of the second connector plate, said second actuator having a second integral annular bead defining a second open end, said second annular bead being sealingly secured to the second connector plate by the fourth bead clamp ring to secure the second open end of the second actuator to the second connector plate, a fifth bead clamp ring mounted on the other mounting surface of the second connector plate, a third open ended longitudinally extendable resilient actuator having an annular bead defining a first open end, said annular bead of the third actuator being in sealing connection with the fifth bead clamp ring for sealingly connecting the first open end of the third actuator to the second connector plate, a top plate, said top plate having a sixth bead clamp ring mounted thereon, said third actuator having a second annular bead defining a second open end, said second bead of the third actuator being in sealing connection with the sixth bead clamp ring to secure the second open end of the third actuator to the top plate, a pipe having one end secured to the top plate, said top plate having an aperture communicating with the interior of the pipe, said pipe having a cap on its other end, said cap being adapted for connection to the second part, said second connector plate having a pair of ports extending therethrough to allow fluid to flow between the second and third actuators, a connector assembly connected to the top plate and to the second connector plate, a second connector assembly connected to the first mentioned connector plate and the second connector plate, whereby movement of the top plate away from the base causes the third actuator to expand a given distance and then the first mentioned connector assembly causes the second connector plate to move along the guide post to extend the second actuator and extension of the second actuator a given amount causes the second connector assembly to move the first mentioned connector plate along the guide post to extend the first actuator.

21. A single action cylinder for affecting reciprocation between a first part and a second part having reciprocating motion relative to each other in a machine comprising, a base adapted for attachment to said first part, said base being adapted for connection to a surge tank, a guide post having one end fixed to said base and being substantially perpendicular to the base, said base including an annular bead groove and a substantially flat lip sealing surface adjacent to the annular bead groove, a first open ended longitudinally extendable resilient actuator having an annular bead and an annular lip formed integral with the bead defining a first open end, said annular bead sealingly mounted in the annular bead groove and the annular lip engaging the lip sealing surface sealingly connecting the first open end of the first actuator to the base, a guide tube mateably mounted on the guide post, a guide ring mounted in the guide tube and slideably engaging the guide post, a connector plate fixed to the guide tube, said connector plate having a pair of substantially flat opposed mounting surfaces, one of said mounting surfaces including an annular bead groove and a substantially flat lip sealing surface adjacent to the annular bead groove, said first actuator having a second annular bead and a second annular lip integral with the bead defining a second open end, said second annular bead positioned in the annular bead groove of the connector plate and the second annular lip sealingly engaging the lip sealing surface for sealingly connecting the second open end of the first actuator to the connector plate, said connector plate having a second annular bead groove on the other mounting surface and a flat lip sealing surface adjacent to the second bead groove, a second open ended longitudinally extendable resilient actuator having a first annular bead and a first integral annular lip defining a first open end, said first annular bead of the second actuator being in sealing engagement with the second annular bead groove of the connector plate and the first annular lip of the second actuator being in engagement with the second lip sealing surface of the connector plate for sealingly securing the first open end of the second actuator to the connector plate, said connector plate having a port to allow fluid to flow between the first actuator and the second actuator, a second guide tube mateably mounted on the guide post, a second guide ring mounted in the second guide tube in sliding engagement with the guide post, a second connector plate fixed to the second guide tube, said second connector plate having a pair of opposed substantially flat mounting surfaces, said second connector plate having a first annular bead groove in one of its mounting surfaces and a lip sealing surface adjacent thereto, said second actuator having a second annular bead and an integral second annular lip defining a second open end, said second annular bead of the second actuator sealingly mounted in the first annular bead groove of the second connector plate and the second annular lip being in sealing engagement with the second lip sealing surface for sealingly connecting the second open end of the second actuator to the second connector plate, said second connector plate having a second annular bead groove on its other substantially flat mounting surface and a second annular lip surface adjacent to the second annular bead groove, a third open ended longitudinally extendable resilient actuator having a first annular bead and a first integral annular lip defining a first open end, said first annular bead of the third actuator being in sealing connection with the second annular bead groove of the second connector plate and the first annular lip in sealing engagement with the second lip sealing surface of the second connector plate for sealingly connecting the first open end of the third actuator to the second connector plate, a top plate having an annular bead groove and a lip sealing surface, said third actuator having a second annular bead and a second annular lip defining a second open end, said second annular bead and the second annular lip of the third actuator being in sealing connection with the annular bead groove and the annular lip sealing surface of the top plate to secure sealingly the second open end of the third actuator to the top plate, a pipe having one end sealingly secured to the top plate, said top plate having an aperture communicating with the interior of the pipe, said pipe having a cap on its other end, said cap being adapted for connection to the second part, said second connector plate having a pair of ports extending therethrough to allow fluid to flow between the second and third actuators, a connector assembly connected to the top plate and to the second connector plate, a second connector assembly connected to the first mentioned connector plate and the second connector plate, whereby movement of the top away from the base causes the third actuator to expand a given distance and then the connector assembly causes the second connector plate to move along the guide post to extend the second actuator and extension of the second actuator a given amount causes the second connector assembly to move the first mentioned connector plate along the guide post to extend the first actuator.

* * * * *

UNITED STATES PATENT AND TRADEMARK OFFICE
CERTIFICATE OF CORRECTION

PATENT NO. : 4,930,336

DATED : June 5, 1990

INVENTOR(S) : Kenneth L. Smedberg, et al.

It is certified that error appears in the above-identified patent and that said Letters Patent is hereby corrected as shown below:

Column 3, line 1, cancel "10"

Column 10, line 54, claim 4, cancel "o" and insert --of--

Signed and Sealed this

Eighteenth Day of June, 1991

Attest:

HARRY F. MANBECK, JR.

Attesting Officer

Commissioner of Patents and Trademarks